United States Patent
Yu et al.

(10) Patent No.: US 9,020,230 B2
(45) Date of Patent: Apr. 28, 2015

(54) METHOD AND APPARATUS FOR ITERATIVE RECONSTRUCTION

(75) Inventors: Zhou Yu, Waukesha, WI (US); Evgeny Drapkin, Waukesha, WI (US); Bruno Kristiaan Bernard De Man, Clifton Park, NY (US); Jean-Baptiste Thibault, Waukesha, WI (US); Kai Zeng, Rexford, NY (US); Jiang Hsieh, Waukesha, WI (US); Brian Edward Nett, Waukesha, WI (US); Debashish Pal, Waukesha, WI (US); Lin Fu, Niskayuna, NY (US); Guangzhi Cao, Waukesha, WI (US); Charles A. Bouman, Jr., Lafayette, IN (US); Ken David Sauer, South Bend, IN (US)

(73) Assignees: General Electric Company, Schenectady, NY (US); The University of Notre Dame Du Lac, Notre Dame, IN (US); Purdue Research Foundation, West Lafayette, IN (US)

( * ) Notice: Subject to any disclaimer, the term of this patent is extended or adjusted under 35 U.S.C. 154(b) by 368 days.

(21) Appl. No.: 13/287,589

(22) Filed: Nov. 2, 2011

(65) Prior Publication Data
US 2013/0108128 A1 May 2, 2013

(51) Int. Cl.
*G06T 11/00* (2006.01)

(52) U.S. Cl.
CPC ......... *G06T 11/006* (2013.01); *G06T 2211/424* (2013.01); *G06T 2211/428* (2013.01)

(58) Field of Classification Search
None
See application file for complete search history.

(56) References Cited

U.S. PATENT DOCUMENTS

| 6,507,633 B1 * | 1/2003 | Elbakri et al. ...................... 378/8 |
| 6,754,298 B2 * | 6/2004 | Fessler ............................... 378/4 |

OTHER PUBLICATIONS

Fessler, Jeffrey A. Booth, Scott D. "Conjugate Gradient Preconditioning Methods for Shift-Variant PET Image Reconstruction," May 1999, IEEE Transactions on IMage Processing, vol. 8, Issue 5, 12 pages.*

Lange, Kenneth. Hunter, David R., Yang, Ilsoon. "Optimization transfer Using Surrogate Objective Functions," Apr. 30, 1999, Journal of Computational and Graphical Statistics, 31 pages.*

Robinson, T. D. Eldred, M. S. Wilcox, K. E. Haimes, R. "Surrogate-Based Optimization Using Multifidelity Models with Variable Paramterization and Corrected Space Mapping," Nov. 2008, AIAA Journal, vol. 46, Issue 11, 9 pages.*

(Continued)

*Primary Examiner* — Sumati Lefkowitz
*Assistant Examiner* — Ryan P Potts
(74) *Attorney, Agent, or Firm* — Dean Small; The Small Patent Law Group, LLC (57) ABSTRACT

A method for reconstructing an image of an object that includes a plurality of image elements. The method includes accessing image data associated with a plurality of image elements, and reconstructing an image of the object by optimizing an objective function, where the objective function is optimized by iteratively solving a nested sequence of approximate optimization problems. The algorithm is composed of nested iterative loops, in which an inner loop iteratively optimizes an objective function approximating the outer loop objective function, and an outer loop that utilizes the solution of the inner loop to optimize the original objective function.

19 Claims, 3 Drawing Sheets

(56) References Cited

OTHER PUBLICATIONS

Wang, Guobao and Qi, Jinyi, "Acceleration of the direct reconstruction of linear parametric images using nested algorithms," Feb. 16, 2010, Physics in Medicine and Biology, 14 pages.*

Fliege, Jorg, and Benar Fux Svaiter. "Steepest descent methods for multicriteria optimization." Mathematical Methods of Operations Research 51.3 (2000): 479-494. 16 pages.*

* cited by examiner

METHOD AND APPARATUS FOR ITERATIVE RECONSTRUCTION

BACKGROUND OF THE INVENTION

The subject matter disclosed herein relates generally to imaging systems, and more particularly, to a method and apparatus for reconstructing an image using iterative techniques.

Traditionally, images have been reconstructed from Computed Tomography (CT) data using direct reconstruction algorithms such as filtered back projection (FBP) or convolution back projection (CBP). Recently, iterative reconstruction (IR) algorithms have again been assessed for use in the reconstruction of CT images. One advantage of IR algorithms is that IR algorithms can more accurately model the measurements obtained from CT systems. This is particularly true for helical CT systems with multi-slice detectors because helical CT systems produce projection measurements that pass obliquely through the two-dimensional (2D) reconstructed image planes. By more accurately modeling these projections, IR algorithms can produce reconstructions with higher quality, lower noise, and fewer artifacts.

However, a major challenge of IR is the computation time and computational resources required to complete a reconstruction. More specifically, because IR has been studied for other types of reconstruction problems, a variety of methods have been proposed for computing the solution to the cost function. Some of these methods include ordered subset expectation maximization (OSEM), preconditioned conjugate gradient (PCG), and iterative coordinate descent (ICD). All of these methods perform the minimization required in equation (1) (shown below) by optimizing an objective function. However, each of the described methods may require a relatively high number of iterations to achieve the final answer. As a result, the conventional IR techniques may require a relatively large amount of time to reconstruct an image.

BRIEF DESCRIPTION OF THE INVENTION

In one embodiment, a method for reconstructing an image of an object that includes a plurality of image elements is provided. The method including accessing measurement data associated with a plurality of image elements, and reconstructing an image of the object by optimizing a first objective function, where the first objective function is optimized by iteratively solving a nested sequence of approximate optimization problems, wherein an inner loop iteratively optimizes a second objective function approximating the first objective function, and an outer loop utilizes the solution of the second objective function to optimize the first objective function.

In another embodiment, an imaging system is provided. The imaging system includes a detector array and a computer coupled to the detector array. The computer is configured to access image data associated with a plurality of image elements, and reconstruct an image of the object by optimizing a first objective function, where the first objective function is optimized by iteratively solving a nested sequence of approximate optimization problems, wherein an inner loop iteratively optimizes a second objective function approximating the first objective function, and an outer loop utilizes the solution of the second objective function to optimize the first objective function.

In a further embodiment, a non-transitory computer readable medium is provided. The non-transitory computer readable medium is programmed to instruct a computer to access image data associated with a plurality of image elements, and reconstruct an image of the object by optimizing a first objective function, where the first objective function is optimized by iteratively solving a nested sequence of approximate optimization problems, wherein an inner loop iteratively optimizes a second objective function approximating the first objective function, and an outer loop utilizes the solution of the second objective function to optimize the first objective function.

DETAILED DESCRIPTION OF THE INVENTION

The foregoing summary, as well as the following detailed description of various embodiments, will be better understood when read in conjunction with the appended drawings. To the extent that the figures illustrate diagrams of the functional blocks of the various embodiments, the functional blocks are not necessarily indicative of the division between hardware circuitry. Thus, for example, one or more of the functional blocks (e.g., processors or memories) may be implemented in a single piece of hardware (e.g., a general purpose signal processor or a block of random access memory, hard disk, or the like) or multiple pieces of hardware. Similarly, the programs may be stand alone programs, may be incorporated as subroutines in an operating system, may be functions in an installed software package, and the like. It should be understood that the various embodiments are not limited to the arrangements and instrumentality shown in the drawings.

Described herein are various embodiments for reconstructing an image using an exemplary algorithm that is composed of nested iteration loops. The image is composed of a plurality of image elements. For the purposes disclosed herein, the term "image element" shall refer to an element of an object within the image space array. For example, an image element may include an image pixel or picture element that can correspond to a single voxel or volume element in a three-dimensional (3D) reconstruction. The image is reconstructed by optimizing an objective function. In the following the terms 'optimize' and 'minimize', 'objective function' and 'cost function' are interchangeable.

Figure 1:
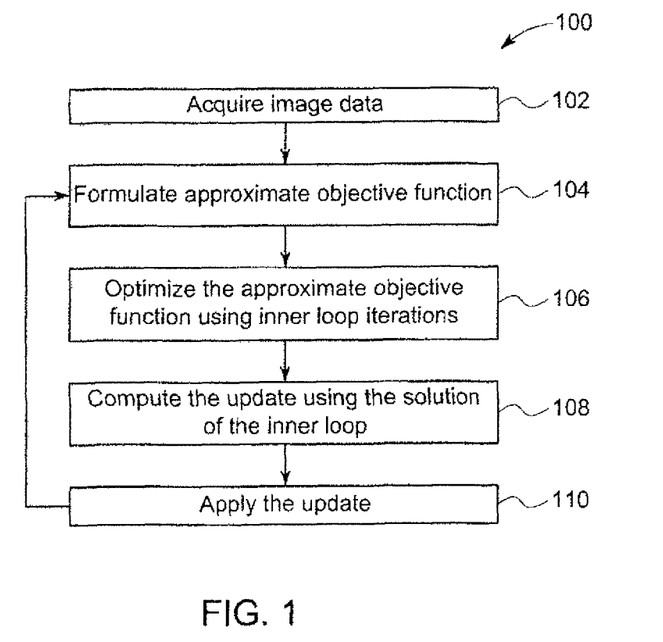
FIG. 1 is a flowchart of an exemplary method for reconstructing an image of an object in accordance with various embodiments.

FIG. 1 is a flowchart of an exemplary method 100 for reconstructing an image of an object. In the exemplary embodiment, the method 100 is embodied as an algorithm that includes a nested approximate optimization framework having an inner loop calculation and an outer loop calculation used to solve an objective function. As used herein, an objective function, or cost function, is generally a model of the imaging used to acquire the imaging data and the noise associated with the imaging system. In operation, the inner loop calculation is utilized to improve the convergence speed of the outer loop iteration. More specifically, the algorithm is composed of nested iteration loops, wherein the inner loop is formulated to iteratively optimize a second objective function defined to approximate the cost function iteratively optimized by the outer loop; and the outer loop iterations optimize the original cost function using the solution generated using the inner loop. In operation, the outer and inner loop calculations converge to the solution of the original cost function in fewer iterations compared to conventional simultaneous algorithms. For example, various embodiments described herein may converge to acceptable image quality in five to ten iterations as compared to 50 or 100 iterations required by conventional algorithms published in the art. The method 100 illustrated in FIG. 1, which includes steps 104-110 is also referred to herein as the outer loop. Accordingly, in the exemplary embodiment, steps 104-110 are performed iteratively until the cost function is reduced to a predetermined level or minimized.

In one embodiment, the objective function is formulated based on the measurement data and the prior knowledge of the image. For example, let x denote the image and y denote the measurement data, wherein both x and y are random vectors. In operation, the method 100 is configured to reconstruct the image by computing the maximum a posteriori (MAP) estimate given by $$x = \arg\min F(x) = \arg\min\{½L(x,y)+U(x)\} \quad \text{Equation 1}$$

where F(x) is the objective function, in which, L(x, y) is the data mismatch term that penalizes the inconsistency between the image and the measurement; and U(x) is the regularization function that penalizes the noise in the image.

In one embodiment, L(x, y) is in the quadratic form as follows:

$$L(x,y) = (Ax-y)^t D(Ax-y) \quad \text{Equation 2}$$

where A is the forward system matrix; D is a diagonal weighing matrix; and f(y) is a function which depends on measurement data only. The $i^{th}$ diagonal entry of the matrix D, denoted by $d_i$, is inversely proportional to the estimate of the variance in the measurement $y_i$.

Accordingly, in the exemplary embodiment described herein, an algorithm includes an outer loop that iteratively minimizes the original cost function and an inner loop that iteratively solves for an approximate cost function that is supplied to the outer loop. In the exemplary embodiment, the outer and inner loops may be constructed using for example, an implicit preconditioner method, and/or a surrogate function method, among others. Each of these methods will now be separately described.

In the implicit preconditioner method, the outer loop algorithm is a generic simultaneous optimization algorithm such as, for example, a gradient descent (GD) or a conjugate gradient (CG) algorithm. In order to improve the convergence speed of these algorithms, a preconditioner is utilized. Accordingly, the inner loop is utilized to apply an implicit preconditioner on the outer loop optimization algorithm in order to improve its convergence speed.

For example, let $M^{-1}$ denote the exemplary preconditioner, and let $\tilde{g}$ denote the search direction computed in the outer loop algorithm, then the new search direction with the preconditioner, computed by the inner loop, is $g = M^{-1}\tilde{g}$. Ideally, M=H to achieve the fastest convergence, where H is the Hessian matrix of the cost function. However, the exact computation of H can be time consuming due to the large scale of the problem, and the computation of $H^{-1}$ is an even harder problem.

Therefore, in some embodiments, the preconditioner is selected as follows: First, M is selected to be simple enough such that the inner loop iteration to compute $M^{-1}\tilde{g}$ can be computed relatively fast. Second, M is selected to be an accurate approximation of H so that the outer loop converges quickly. In some embodiments, $M^{-1}$ can be defined explicitly so that $M^{-1}\tilde{g}$ can be computed without inner loop iterations. For example, simple matrices such as diagonal matrix may be applied as a preconditioner. However, in some embodiments, these explicitly defined matrices might not achieve a desired approximation of $M^{-1}$, and therefore may not sufficiently improve the convergence speed of the outer loop, such as for a particular application. Accordingly, in the exemplary embodiments described herein, instead of defining $M^{-1}$ explicitly, M is defined as a close approximation of H, so that M is relatively easy to compute and $M^{-1}\tilde{g}$ can be solved iteratively. The iterations to solve the problem $M^{-1}\tilde{g}$ are performed by the inner loop.

To implement the outer loop using a gradient descent algorithm, the following function may be utilized:
repeat $\tilde{g} \leftarrow A^t D(Ax-y) + U'(x)$, where $U'(x)$ is the first derivative of $U(x)$ $Mg = \tilde{g}$ solved iteratively by the inner loops $x \leftarrow x+g$ until image x is converged In the surrogate function method, each outer loop iteration computes a surrogate function that is a local approximate to the original cost function based on the current image. The surrogate function is then reduced to a predetermined level or minimized by the inner loop iterations. The surrogate function is simple enough such that the computational cost of solving the surrogate function problem is reduced comparing to solving the original problem. Moreover, the surrogate function also satisfies conditions to guarantee the convergence of the true (original) cost function. For example, let F(x) denote the original cost function in Equation 1, and $S^{(n)}(x)$ denote the surrogate function of F(x) at iteration n. Then $S^{(n)}(x)$ satisfies the following conditions:

$$S^{(n)}(x^{(n)}) = F(x^{(n)}) \quad \text{Equation 3}$$

$$S^{(n)\prime}(x^{(n)}) = F'(x^{(n)}) \quad \text{Equation 4}$$

$$S^{(n)}(x) \geq F(x) \quad \text{Equation 5}$$

In the exemplary embodiment, the initial search direction using a gradient descent method is calculated in accordance with:

$$\nabla F(x^{(n)}) = A^t D(Ax^{(n)}-y) + U'(x^{(n)}) \quad \text{Equation 7}$$

where $\nabla F(x^{(n)})$ is the gradient of F(x) at $x=x^{(n)}$. A is a forward system matrix; D is a diagonal weighting matrix; and U' is the derivative of the cost function U(x).

Referring again to FIG. 1, at 102, measurement data is acquired using an exemplary imaging system. At 104, an approximate objective function is formulated. In the exemplary embodiment, the inner loop portion 106 of the algorithm is utilized to increase convergence speed of the algorithm, or to decrease computational complexity for fast implementation on computer hardware. Accordingly, the inner loop may be defined by either an implicit preconditioner or a surrogate function. In operation, the inner loop is configured to approximate the Hessian matrix of the true cost function. The approximate Hessian matrix is then utilized to define the implicit preconditioner or the surrogate function. In operation, the implicit preconditioner method determines M to be an acceptable approximation of H, while the $M^{-1}$ is relatively easy to compute. In the surrogate function method, let $S''^{(n)}(x)$ denote the Hessian of the surrogate function. Accordingly, $S''^{(n)}(x)$ is selected to be an accurate approximation to H(x), easy to compute, and satisfy $S''^{(n)}(x) \geq H(x)$.

In the exemplary embodiment, The Hessian of the true cost function is given by $H(x)=A^tDA+U''(x)$. The most computational intensive part in H is in computing $A^tDA$. Therefore, in the exemplary embodiment, two approximation methods may be utilized to simplify the computation of the $(A)^tD(A)$.

In one embodiment, an Image Space Approximation to the $A^tDA$ operator is utilized. For example, consider an exemplary case where D is an identity matrix, then only $A^tA$ is approximated. Moreover, K is defined as $K=A^tA$, and $K_j$ denotes the $j^{th}$ column of matrix $A^tA$ for the remainder of this application.

Figure 3:
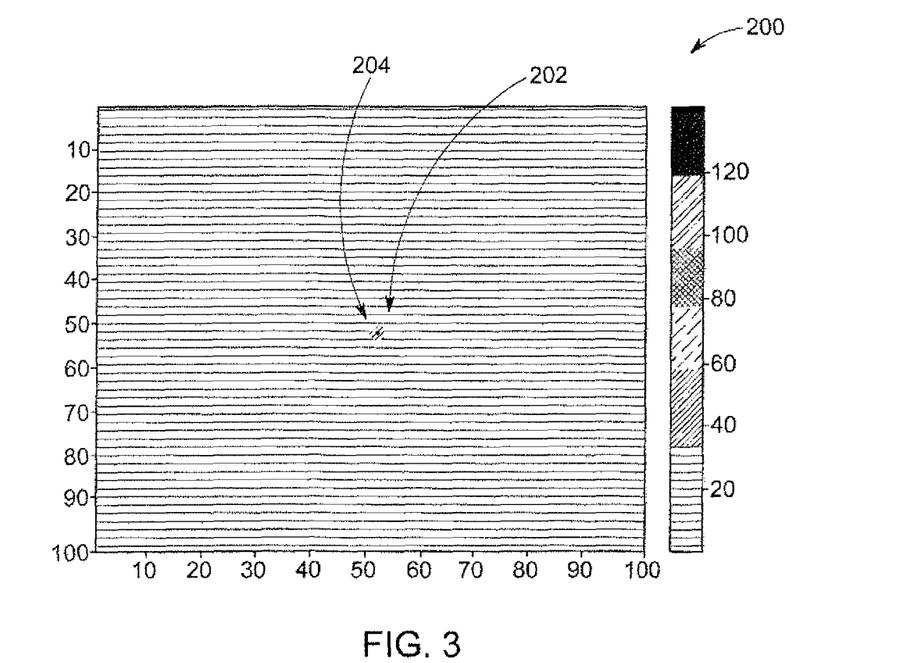
FIG. 3 is a visual representation of an exemplary image that may be acquired in accordance with various embodiments.
Figure 4:
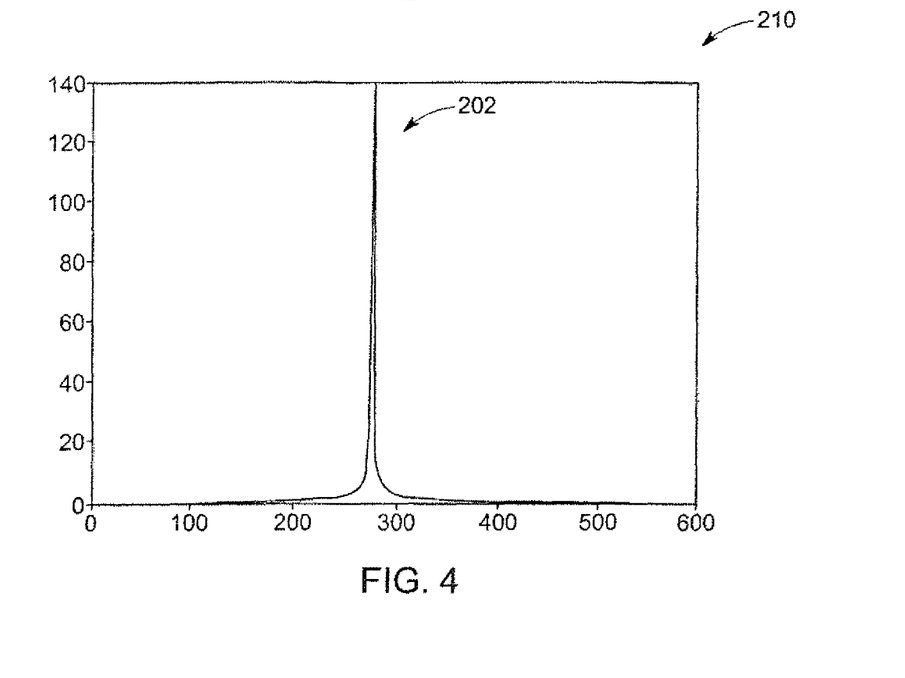
FIG. 4 is a graphical illustration that may be acquired in accordance with various embodiments.

For example, FIG. 3 is an exemplary image 200 which illustrates the Kj for a pixel 202 in an iso center 204 of the image 200. Moreover, FIG. 4 is a graphical illustration 210 which shows the pixel counts profile of the pixel 202 along the horizontal axis. In operation, $K_j$ is computed for each voxel in the image and stored in a matrix. Based on the characteristic of $K_j$, $K_j$ may be significantly reduced to increase the computation speed. More specifically, assume that $K_j$ varies slowly in space. Therefore, K may be approximated using a locally linear spatial invariant (LSI) operator. That is, K can be approximately computed by filtering the image x with a small set of filter kernels, $K_j$, that are sampled at different locations. For example, in operation a small set of $K_j$ kernels may be precomputed for each slice at the iso-center. This approximate operator is denoted as $\tilde{K}$.

Next, the $A^tDA$ operator is approximated. In one embodiment, the approximation selected for use is a Fessler and Rogers approximation in accordance with:

$$A^tDA \approx \Lambda A^tA \Lambda \qquad \text{Equation 8}$$

where $\Lambda$ is a diagonal matrix.

Accordingly, $A^tDA$ is in one embodiment, approximated to $\Lambda \tilde{K} \Lambda$ wherein the proposed operator is a pure image space operator and is easy to compute since it only requires filtering and scaling of the images.

In another embodiment, instead of approximating $A^tDA$ as a whole equation, the calculation may be simplified by calculating (Ax−y) using simpler forward models such as pixel driven or ray driven forward and back projections. The computation time of iterative reconstruction depends on the accuracy of the system model being used. More specifically, an accurate system model which incorporates the exact 3D scanning geometry, the effect of finite focal spot size, detector blurring, or other physical effects, adds computation time. Accordingly, various methods of simplification and approximations may be utilized to reduce computation time. For example, assuming an ideal line integral model, Siddon's method may be used to efficiently compute line integrals through a 3D pixel array.

In the exemplary embodiment, a simplified forward model in the inner iterations is used to approximate the Hessian matrix of the cost function, while still maintaining image quality by using a more accurate forward model in the outer loop. For example, let $\tilde{A}$ denote the simplified, but more computationally efficient system model (relative to the original system matrix A which is used to define the cost function). In the inner loop iterations, $M=\tilde{A}^tD\tilde{A}$ can be used to approximate $A^tDA$. In operation, the inner loop is therefore solving an image reconstruction problem using $\tilde{A}$ instead of A. Compared to the image space approximation approach described above, the $\tilde{A}^tD\tilde{A}$ approximation directly incorporates the statistical weighting and the forward and back projection operators using $\tilde{A}$, and thus, provides an improved approximation to the accurate 3D space-variant Hessian matrix and accelerates convergence of the outer iterations relative to a simpler inner loop model. If $\tilde{A}^tD\tilde{A}$ is properly constructed such that the inner loop problem can be solved much faster than the original reconstruction, the overall computation time of this nested approximate optimization framework is reduced compared to using $A^tDA$ alone.

In operation, there are various methods to construct $\tilde{A}$. For example, $\tilde{A}$ can be computed using a lower-resolution image grid of detectors. In the field of PET reconstruction, $\tilde{A}$ may be constructed by ignoring certain physical effects (positron range, crystal penetration, etc.), using a numerically more sparse system matrix, or configured based on texture mapping hardware on the GPU. One example for CT reconstruction is that the outer loop may compute $\tilde{A}$ using a model, such as the Distance Driven model, while the inner loop is computed using Pixel Driven or Ray Driven models with coarse sampling in focal spot and detector cells. Another example is that the outer loop may compute $\tilde{A}$ using exact 3D cone beam geometry, while the inner loop $\tilde{A}$ is computed using a parallel or semi-parallel beam geometry using rebinned or re-sliced sinogram. $\tilde{A}$ may also be computed using data types with lower precision and faster computation than $\tilde{A}$. $\tilde{A}$ may also be computed using a Fast Fourier Transform (FFT) based technique. As used herein, in various embodiments, "fast" refers to faster computation than for the full original model A. For instance, "fast" can refer to a computational complexity on the order of $N^2 \log(N)$ instead of $N^3$ in 2D reconstruction or $N^3 \log(N)$ instead of $N^4$ in 3D reconstruction. These fast approaches may include a non-uniform FFT method, a pseudo-polar FFT method, an equisloped tomography method, and/or a hierarchical method. $\tilde{A}$ may also be computed with lower resolution, but higher-order image basis functions from A. For example, instead of using rectangular voxels, $\tilde{A}^tD\tilde{A}$ may be computed using a piece-wise linear or higher-order parametric representation of voxels (for example, a z-slope voxel model or blobs).

In another embodiment, the inner loop is formulated using a surrogate function method. In the surrogate function method, it requires that the approximate function upper bounds the true cost function. Accordingly, in order to provide this condition, the following condition is used in various embodiments, $$x^t \Lambda K \Lambda x \geq x^t A^t D A x, \forall x \qquad \text{Equation 9}$$

For the image space approximation discussed above, when the inequality in Equation 9 is not true, the K operator may be modified in the image space or frequency space to provide the condition. For example, in the image space, a window function W(i, j) can be applied on the estimated filter kernel. By increasing the values in W(i, j) the inequality condition can be provided. Similarly, a window function in the frequency space can be utilized. In a further embodiment, the magnitude of the kernel can be spatially scaled by modifying the $\Lambda$ matrix. Similarly, in the approximation of A, the same technique may be applied to scale the forward model of the filtered forward projection data in the sinogram space to achieve the frequency domain modulation.

In one embodiment, when the $A^tDA$ approximation is used, the inner loop may be solved using an Iterative Coordinate Descent (ICD) algorithm. In operation, the ICD algorithm uses the fast approximate computation of $A^tDA$ operator discussed above. For example, let $\theta=A^tD(Ax-y)$ be the backprojection of the weighted error sinogram. In operation, the $\theta$ map is tracked instead of the error sinogram. Moreover, the θ map is updated according to the approximate cost function, by convolution in image space.

The calculation of the forward projection and back projection of a single voxel is completely eliminated in this embodiment. The step to solve the one-dimensional (1D) optimization problem remains the same.

$$\theta = \Lambda \tilde{K} \Lambda \delta x \qquad \text{Equation 10}$$

Figure 2:
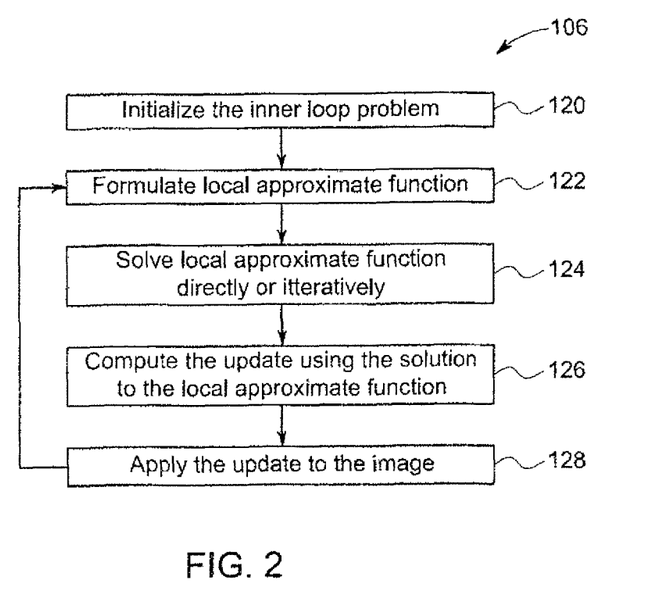
FIG. 2 is another flowchart of an exemplary method for reconstructing an image of an object in accordance with various embodiments.

Referring again to FIG. 1, at 106, a the approximate objective function $f^{(n)}(x)$ is optimized using the inner loop iterations shown in FIG. 2. In operation, and referring to FIG. 2, at 120, the inner loop is initialized. In operation, the solution of $f^{(n)}(x)$ minimized by the inner loop is input to the outer loop during each iteration. In the exemplary embodiment, the step 106 is also referred to herein as the inner loop. Accordingly, FIG. 2 illustrates step 106 which includes steps 120-128 which are used to solve the inner loop problem that is then utilized to solve the problem in the outer loop.

Accordingly, the update for $\theta_i$ after voxel update $\delta x_j$ is given by:

$$\delta \theta_i = \lambda_i k(j,i) \lambda_j \delta x_j \qquad \text{Equation 11}$$

In another embodiment, the inner loop cost function $f^{(n)}(x)$ can be minimized using further approximation. At 122, a local approximate function is formulated. In one embodiment, one can further approximate the regularization term in the cost function to derive an image space preconditioner. More specifically, an LSI approximation is determined based on a second derivative of the regularization function U(x). The Hessian of the full cost function is given by $H(x)=A^tDA+U''(x)$. Because a linear spatial invariant (LSI) approximation to the $A^tDA$ operator has already been derived, the LSI approximation to the second derivative of the regularization function, that is, U'' remains to be derived. In one embodiment U'' may be approximated using a quadratic surrogate function for U(x). For example, the quadratic surrogate function may be written in the form of $x^t \Lambda R \Lambda x$. The full quadratic surrogate function including both the data term and the image regularization term may then be defined for the inner loop problem with the following Hessian matrix:

$$M = \Lambda(\tilde{K} + R)\Lambda \qquad \text{Equation 12}$$

It should be noted that if a further approximation of R with a matrix $\tilde{R}$ is found, such that R is an LSI filter, then $(\tilde{K}+\tilde{R})^{-1}$ can be computed using the Fourier transform. Accordingly, the image space preconditioner may be defined in accordance with:

$$\tilde{M}^{-1} = \Lambda^{-1}(\tilde{K}+\tilde{R})^{-1}\Lambda^{-1} \qquad \text{Equation 13}$$

At 124, the local approximate function may be solved directly or iteratively. More specifically, at 120, the inner loop problem is initialized. At 122, an initial search direction is computed. In the exemplary embodiment, the initial search direction may be computed in accordance with:

$$\nabla f(x^{(n)}) = \theta^{(0)} + \Lambda \tilde{K} \Lambda (x^{(n)} - x^{(0)}) + U'(x^{(n)}) \qquad \text{Equation 14}$$

where $\nabla f(x^{(n)})$ is the gradient of the inner loop approximate cost function f(x) at $x=x^{(n)}$, and $\theta^{(0)}$ and $x^{(0)}$ are supplied by the outer loop at 120, U' is the derivative of the regularization term U(x). An improved search direction is computed by applying a filter $\tilde{M}^{-1}$. In the exemplary embodiment, at 126, the update may be computed using the solution to the local approximate function and the improved search direction is computed in accordance with:

$$g^{(n)} = (\Lambda(\tilde{K}+\tilde{R})\Lambda)^{-1}\nabla f(x^{(n)}) \qquad \text{Equation 15}$$

An optimal step size is computed along the new improved search direction in accordance with:

$$\gamma^{(n)} = \arg \min f(x^{(n)} + \gamma g^{(n)}) \qquad \text{Equation 16}$$

At 128, the updates from steps 120-126 are applied in accordance with:

$$x^{(n+1)} = x^{(n)} + \gamma^{(n)} g^{(n)} \qquad \text{Equation 17}$$

The output from the inner loop calculations are then input to the outer loop. More specifically, and referring again to FIG. 1, after the input has been received from the inner loop calculations, an optimized approximate objective function is computed at 106 by solving the inner loop problem in accordance with:

$$x^* = \arg \min f(x)$$

and the new search direction for the outer loop is given by
$g^{(n)} = x^* - x^{(n)}$ Equation 18

At 108, an update is computed in accordance with:

$$\gamma^{(n)} = \arg \min F(x^{(n)} + \gamma g^{(n)}) \qquad \text{Equation 19}$$

At 110, the image is updated based on the above calculations in accordance with:

$$x^{(n+1)} = x^{(n)} + \gamma^{(n)} g^{(n)} \qquad \text{Equation 20}$$

The methods and algorithms described herein are used to reconstruct an image of an object. The methods and algorithms may be embodied as a set of instructions that are stored on a computer and implemented using, for example, a module 530, shown in FIG. 5, software, hardware, a combination thereof, or a tangible non-transitory computer readable medium.

Figure 5:
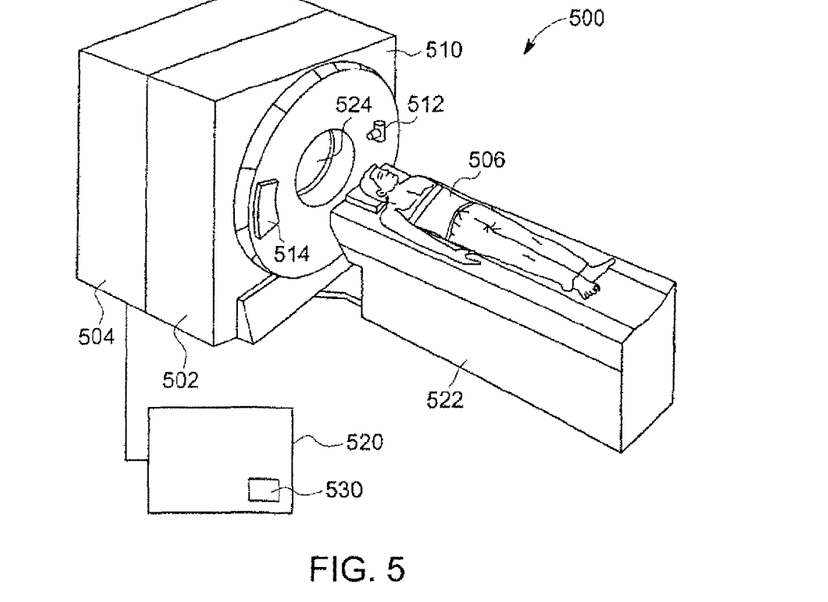
FIG. 5 is a pictorial view of an exemplary multi-modality imaging system formed in accordance with various embodiments.
Figure 6:
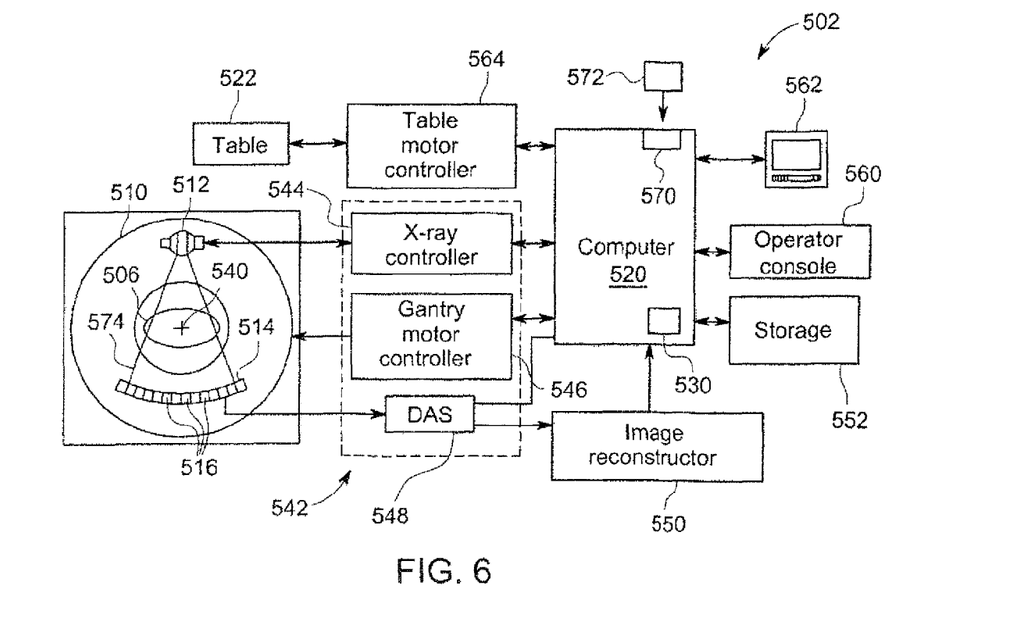
FIG. 6 is a block schematic diagram of the system illustrated in FIG. 5.

FIG. 5 is a pictorial view of an exemplary imaging system 500 that is formed in accordance with various embodiments. FIG. 6 is a block schematic diagram of a portion of the multi-modality imaging system 500 shown in FIG. 5. The imaging system may be embodied as a computed tomography (CT) imaging system, a positron emission tomography (PET) imaging system, a magnetic resonance imaging (MRI) system, an ultrasound imaging system, an x-ray imaging system, a single photon emission computed tomography (SPECT) imaging system, an interventional C-Arm tomography imaging system, a CT system for a dedicated purpose such as extremity or breast scanning, and combinations thereof, among others. In the exemplary embodiment, the method 100 is described with respect to a CT imaging system. Moreover, in the exemplary embodiment, the cost function is used to explain the various embodiments described herein.

Although various embodiments are described in the context of an exemplary dual modality imaging system that includes a computed tomography (CT) imaging system and a positron emission tomography (PET) imaging system, it should be understood that other imaging systems capable of performing the functions described herein are contemplated as being used.

The multi-modality imaging system 500 is illustrated, and includes a CT imaging system 502 and a PET imaging system 504. The imaging system 500 allows for multiple scans in different modalities to facilitate an increased diagnostic capability over single modality systems. In one embodiment, the exemplary multi-modality imaging system 500 is a CT/PET imaging system 500. Optionally, modalities other than CT and PET are employed with the imaging system 500. For example, the imaging system 500 may be a standalone CT imaging system, a standalone PET imaging system, a magnetic resonance imaging (MRI) system, an ultrasound imaging system, an x-ray imaging system, and/or a single photon emission computed tomography (SPECT) imaging system, interventional C-Arm tomography, CT systems for a dedicated purpose such as extremity or breast scanning, and combinations thereof, among others.

The CT imaging system 502 includes a gantry 510 that has an x-ray source 512 that projects a beam of x-rays toward a detector array 514 on the opposite side of the gantry 510. The detector array 514 includes a plurality of detector elements 516 that are arranged in rows and channels that together sense the projected x-rays that pass through an object, such as the subject 506. The imaging system 500 also includes a computer 520 that receives the projection data from the detector array 514 and processes the projection data to reconstruct an image of the subject 506. In operation, operator supplied commands and parameters are used by the computer 520 to provide control signals and information to reposition a motorized table 522. More specifically, the motorized table 522 is utilized to move the subject 506 into and out of the gantry 510. Particularly, the table 522 moves at least a portion of the subject 506 through a gantry opening 524 that extends through the gantry 510.

The imaging system 500 also includes a module 530 that is configured to implement various methods and algorithms described herein. The module 530 may be implemented as a piece of hardware that is installed in the computer 520. Optionally, the module 530 may be implemented as a set of instructions that are installed on the computer 520. The set of instructions may be stand alone programs, may be incorporated as subroutines in an operating system installed on the computer 520, may be functions in an installed software package on the computer 520, and the like. It should be understood that the various embodiments are not limited to the arrangements and instrumentality shown in the drawings.

As discussed above, the detector 514 includes a plurality of detector elements 516. Each detector element 516 produces an electrical signal, or output, that represents the intensity of an impinging x-ray beam and hence allows estimation of the attenuation of the beam as it passes through the subject 506. During a scan to acquire the x-ray projection data, the gantry 510 and the components mounted thereon rotate about a center of rotation 540. FIG. 8 shows only a single row of detector elements 516 (i.e., a detector row). However, the multislice detector array 514 includes a plurality of parallel detector rows of detector elements 516 such that projection data corresponding to a plurality of slices can be acquired simultaneously during a scan.

Rotation of the gantry 510 and the operation of the x-ray source 512 are governed by a control mechanism 542. The control mechanism 542 includes an x-ray controller 544 that provides power and timing signals to the x-ray source 512 and a gantry motor controller 546 that controls the rotational speed and position of the gantry 510. A data acquisition system (DAS) 548 in the control mechanism 542 samples analog data from detector elements 516 and converts the data to digital signals for subsequent processing. For example, the subsequent processing may include utilizing the module 530 to implement the various methods described herein. An image reconstructor 550 receives the sampled and digitized x-ray data from the DAS 548 and performs high-speed image reconstruction. The reconstructed images are input to the computer 520 that stores the image in a storage device 552. Optionally, the computer 520 may receive the sampled and digitized x-ray data from the DAS 548 and perform various methods described herein using the module 530. The computer 520 also receives commands and scanning parameters from an operator via a console 560 that has a keyboard. An associated visual display unit 562 allows the operator to observe the reconstructed image and other data from computer.

The operator supplied commands and parameters are used by the computer 520 to provide control signals and information to the DAS 548, the x-ray controller 544 and the gantry motor controller 546. In addition, the computer 520 operates a table motor controller 564 that controls the motorized table 522 to position the subject 506 in the gantry 510. Particularly, the table 522 moves at least a portion of the subject 506 through the gantry opening 524 as shown in FIG. 5.

Referring again to FIG. 6, in one embodiment, the computer 520 includes a device 570, for example, a floppy disk drive, CD-ROM drive, DVD drive, magnetic optical disk (MOD) device, or any other digital device including a network connecting device such as an Ethernet device for reading instructions and/or data from a computer-readable medium 572, such as a floppy disk, a CD-ROM, a DVD or an other digital source such as a network or the Internet, as well as yet to be developed digital means. In another embodiment, the computer 520 executes instructions stored in firmware (not shown). The computer 520 is programmed to perform functions described herein, and as used herein, the term computer is not limited to just those integrated circuits referred to in the art as computers, but broadly refers to computers, processors, microcontrollers, microcomputers, programmable logic controllers, application specific integrated circuits, and other programmable circuits, and these terms are used interchangeably herein.

In the exemplary embodiment, the x-ray source 512 and the detector array 514 are rotated with the gantry 510 within the imaging plane and around the subject 506 to be imaged such that the angle at which an x-ray beam 574 intersects the subject 506 constantly changes. A group of x-ray attenuation measurements, i.e., projection data, from the detector array 514 at one gantry angle is referred to as a "view". A "scan" of the subject 506 comprises a set of views made at different gantry angles, or view angles, during one revolution of the x-ray source 512 and the detector 514. In a CT scan, the projection data is processed to reconstruct an image that corresponds to a two dimensional slice taken through the subject 506.

Exemplary embodiments of a multi-modality imaging system are described above in detail. The multi-modality imaging system components illustrated are not limited to the specific embodiments described herein, but rather, components of each multi-modality imaging system may be utilized independently and separately from other components described herein. For example, the multi-modality imaging system components described above may also be used in combination with other imaging systems.

As used herein, the term "computer" may include any processor-based or microprocessor-based system including systems using microcontrollers, reduced instruction set computers (RISC), application specific integrated circuits (ASICs), logic circuits, and any other circuit or processor capable of executing the functions described herein. The above examples are exemplary only, and are thus not intended to limit in any way the definition and/or meaning of the term "computer". The computer or processor executes a set of instructions that are stored in one or more storage elements, in order to process input data. The storage elements may also store data or other information as desired or needed. The storage element may be in the form of an information source or a physical memory element within a processing machine.

The set of instructions may include various commands that instruct the computer or processor as a processing machine to perform specific operations such as the methods and processes of the various embodiments of the invention. The set of instructions may be in the form of a software program. The software may be in various forms such as system software or application software, which may be a non-transitory computer readable medium. Further, the software may be in the form of a collection of separate programs, a program module within a larger program or a portion of a program module. The software also may include modular programming in the form of object-oriented programming. The processing of input data by the processing machine may be in response to user commands, or in response to results of previous processing, or in response to a request made by another processing machine.

As used herein, an element or step recited in the singular and proceeded with the word "a" or "an" should be understood as not excluding plural of said elements or steps, unless such exclusion is explicitly stated. Furthermore, references to "one embodiment" of the present invention are not intended to be interpreted as excluding the existence of additional embodiments that also incorporate the recited features. Moreover, unless explicitly stated to the contrary, embodiments "comprising" or "having" an element or a plurality of elements having a particular property may include additional elements not having that property.

Also as used herein, the phrase "reconstructing an image" is not intended to exclude embodiments of the present invention in which data representing an image is generated, but a viewable image is not. Therefore, as used herein the term "image" broadly refers to both viewable images and data representing a viewable image. However, many embodiments generate, or are configured to generate, at least one viewable image.

As used herein, the terms "software" and "firmware" are interchangeable, and include any computer program stored in memory for execution by a computer, including RAM memory, ROM memory, EPROM memory, EEPROM memory, and non-volatile RAM (NVRAM) memory. The above memory types are exemplary only, and are thus not limiting as to the types of memory usable for storage of a computer program.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the invention without departing from its scope. While the dimensions and types of materials described herein are intended to define the parameters of the invention, they are by no means limiting and are exemplary embodiments. Many other embodiments will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. §112, sixth paragraph, unless and until such claim limitations expressly use the phrase "means for" followed by a statement of function void of further structure.

This written description uses examples to disclose the various embodiments of the invention, including the best mode, and also to enable any person skilled in the art to practice the various embodiments of the invention, including making and using any devices or systems and performing any incorporated methods. The patentable scope of the various embodiments of the invention is defined by the claims, and may include other examples that occur to those skilled in the art. Such other examples are intended to be within the scope of the claims if the examples have structural elements that do not differ from the literal language of the claims, or if the examples include equivalent structural elements with insubstantial differences from the literal languages of the claims.

What is claimed is:

1. A method for reconstructing an image of an object, the image including a plurality of image elements, said method comprising:
    accessing image data associated with a plurality of image elements; and
    reconstructing an image of the object by optimizing a first objective function, where the first objective function is optimized by iteratively solving a nested sequence of approximate optimization problems, wherein an inner loop solves iteratively for an implicit preconditioner, and an outer loop uses the implicit preconditioner from the inner loop to optimize the first objective function;
    wherein solving iteratively, by the inner loop, for the implicit preconditioner comprises:
        selecting a matrix (M) as an approximation of a Hessian matrix of the first objective function; and
        solving for an inverse ($M^{-1}$) of M iteratively, wherein $M^{-1}$ is the implicit preconditioner.

2. The method of claim 1 wherein the outer loop uses a simultaneous optimization algorithm to optimize the first objective function, a first search direction is computed in the outer loop, and the implicit preconditioner from the inner loop is used to modify the first search direction to provide a new search direction.

3. The method of claim 1, wherein the outer loop is performed at least once and the inner loop is performed at least once.

4. The method of claim 1, wherein at least one of the inner loop or the outer loop is combined with an acceleration method.

5. The method of claim 1, further comprising constructing an approximate objective function by approximating a Hessian of the first objective function.

6. The method of claim 5, wherein an A operator and an A' operator are approximated using a simple forward and back projection, wherein the simple forward and back projection includes one of a pixel driven or ray driven projection, and wherein A is a forward system matrix.

7. The method of claim 5, further comprising constructing an approximate objective function using a locally linear spatial invariant (LSI) approximation of the Hessian of the first objective function.

8. The method of claim 1, further comprising solving the inner loop using further approximation to the first objective function.

9. The method of claim 8, wherein the inner loop uses a preconditioned simultaneous algorithm that is constructed by a linear spatial invariant (LSI) approximation of a Hessian of a regularization function.

10. The method of claim 1, wherein the preconditioner is configured to improve convergence speed of a simultaneous optimization algorithm.

11. An imaging system comprising:
a detector array; and
a computer coupled to the detector array, the computer configured to:
  access image data associated with a plurality of image elements; and
  reconstruct an image of an object by optimizing a first objective function, where the first objective function is optimized by iteratively solving a nested sequence of approximate optimization problems, wherein an inner loop solves iteratively for an implicit preconditioner, and an outer loop uses the implicit preconditioner from the inner loop to optimize the first objective function;
  wherein solving iteratively, by the inner loop, for the implicit preconditioner comprises:
  selecting a matrix (M) as an approximation of a Hessian matrix of the first objective function; and
  solving for an inverse ($M^{-1}$) of M iteratively, wherein $M^{-1}$ is the implicit preconditioner.

12. The imaging system of claim 11, wherein the outer loop uses a simultaneous optimization algorithm to optimize the first objective function, a first search direction is computed in the outer loop, and the implicit preconditioner from the inner loop is used to modify the first search direction to provide a new search direction.

13. The imaging system of claim 11, further comprising constructing an approximate objective function by approximating a Hessian of the first objective function.

14. The imaging system of claim 11, wherein the outer loop is performed at least once and the inner loop is performed at least once.

15. The imaging system of claim 11, further comprising solving the inner loop using further approximation to the first objective function.

16. The imaging system of claim 11, wherein the inner loop or the outer loop is combined with an acceleration method.

17. The imaging system of claim 11, wherein the inner loop is solved by using a locally linear spatial invariant (LSI) approximation of a Hessian of a regularization function.

18. A non-transitory computer readable medium being programmed to instruct a computer to:
  access image data associated with a plurality of image elements; and
  reconstruct an image of the object by optimizing a first objective function, where the first objective function is optimized by iteratively solving a nested sequence of approximate optimization problems, wherein an inner loop solves iteratively for an implicit preconditioner, and an outer loop uses the implicit preconditioner from the inner loop to optimize the first objective function;
  wherein solving iteratively, by the inner loop, for the implicit preconditioner comprises:
  selecting a matrix (M) as an approximation of a Hessian matrix of the first objective function; and
  solving for an inverse ($M^{-1}$) of M iteratively, wherein $M^{-1}$ is the implicit preconditioner.

19. The non-transitory computer readable medium of claim 18, wherein the outer loop uses a simultaneous optimization algorithm to optimize the first objective function, a first search direction is computed in the outer loop, and the implicit preconditioner from the inner loop is used to modify the first search direction to provide a new search direction.

* * * * *